United States Patent
Kothari et al.

(10) Patent No.: US 9,225,343 B2
(45) Date of Patent: Dec. 29, 2015

(54) ELECTRONICS DEVICE CAPABLE OF EFFICIENT COMMUNICATION BETWEEN COMPONENTS WITH ASYNCRONOUS CLOCKS

(75) Inventors: Love Kothari, Sunnyvale, CA (US); Mark Fullerton, Austin, TX (US); Rajesh Rajan, Bangalore (IN); Veronica Alarcon, San Jose, CA (US)

(73) Assignee: Broadcom Corporation, Irvine, CA (US)

( * ) Notice: Subject to any disclaimer, the term of this patent is extended or adjusted under 35 U.S.C. 154(b) by 681 days.

(21) Appl. No.: 13/338,001

(22) Filed: Dec. 27, 2011

(65) Prior Publication Data

US 2013/0044844 A1 Feb. 21, 2013

Related U.S. Application Data

(60) Provisional application No. 61/524,538, filed on Aug. 17, 2011.

(51) Int. Cl.

| | | |
|---|---|---|
| *H04L 7/02* | (2006.01) | |
| *H03L 7/08* | (2006.01) | |
| *H03K 3/03* | (2006.01) | |
| *H03K 3/037* | (2006.01) | |
| *H03K 19/01* | (2006.01) | |
| *G06F 12/14* | (2006.01) | |
| *G06F 21/44* | (2013.01) | |
| *H03K 5/13* | (2014.01) | |
| *H03L 7/097* | (2006.01) | |

(Continued)

(52) U.S. Cl.
CPC ............... *H03L 7/0802* (2013.01); *G06F 1/32* (2013.01); *G06F 12/14* (2013.01); *G06F 21/44* (2013.01); *H03K 3/0315* (2013.01); *H03K 3/0375* (2013.01); *H03K 5/133* (2013.01); *H03K 19/01* (2013.01); *H03L 7/097* (2013.01); *H03L 7/0997* (2013.01); *G06F 1/26* (2013.01); *G06F 1/3203* (2013.01); *G06F 1/3228* (2013.01);

(Continued)

(58) Field of Classification Search
CPC ............ G06F 1/12; G06F 1/32; G06F 1/324; G06F 9/3871; G06F 11/2074; G06F 11/2082; G06F 11/2076; G06F 13/1689; G06F 13/405; G06F 13/4059; G06F 13/38; G06F 1/08; G06F 1/10; G06F 13/429; H03K 19/17716; H03K 3/0315; H03K 3/0375; H03K 2005/00026; H03K 2005/00058; H03K 2005/00097; H03K 2005/00136; H03K 19/01855; H03K 19/096; H04L 7/0012; H04L 7/02; H04L 7/033; H04L 7/027; H04L 7/0331; H04L 25/4904
USPC ................. 375/360, 359, 370, 362, 372, 373; 327/41, 43, 141, 144, 145, 147; 711/400, 501, 500, 600
See application file for complete search history.

(56) References Cited

U.S. PATENT DOCUMENTS 5,526,360 A * 6/1996 Kraft .............................. 370/535
6,782,486 B1 * 8/2004 Miranda et al. ............... 713/601

(Continued)

*Primary Examiner* — Rahel Guarino
(74) *Attorney, Agent, or Firm* — Sterne, Kessler, Goldstein & Fox PLLC

(57) ABSTRACT

An electronics device is disclosed that reduces latency resulting from communication between a first electronics component operating based on a fast clock and a second electronics component operating based on a slow clock reduces communication latency. When transferring the data from the first component to the second, the data is written into a buffer using the first clock, and then extracted by the second component using the second clock. Alternatively, when transferring the data from the second component to the first component, the first component reads the data from the second component and monitors whether the data was extracted during a relevant edge of the second clock signal, in which case the first component again extracts the data from the second component.

19 Claims, 10 Drawing Sheets

(51) Int. Cl.
*H03L 7/099* (2006.01)
*G06F 1/32* (2006.01)
*G06F 1/26* (2006.01)
*H03K 5/00* (2006.01)

(52) U.S. Cl.
CPC .................. *H01L2924/0002* (2013.01); *H03K 2005/00026* (2013.01); *H03K 2005/00058* (2013.01)

(56) References Cited

U.S. PATENT DOCUMENTS

| | | | | |
|---|---|---|---|---|
| 6,931,562 | B1* | 8/2005 | Radjassamy | 713/501 |
| 7,219,175 | B1* | 5/2007 | Davis et al. | 710/105 |
| 7,813,459 | B2* | 10/2010 | Hasan et al. | 375/354 |
| 8,069,363 | B2* | 11/2011 | Roth et al. | 713/400 |
| 8,176,352 | B2* | 5/2012 | Gillespie et al. | 713/600 |

* cited by examiner

ELECTRONICS DEVICE CAPABLE OF EFFICIENT COMMUNICATION BETWEEN COMPONENTS WITH ASYNCRONOUS CLOCKS

CROSS REFERENCE TO RELATED APPLICATIONS

This patent application claims the benefit of U.S. Provisional Patent Application No. 61/524,538, filed Aug. 17, 2011, entitled "Power Management Unit," which is incorporated herein by reference in its entirety.

BACKGROUND

1. Field of Invention

The invention relates to an electronics device, and more specifically to an electronics device capable of communicating between components operating at different clock speeds with reduced latency and/or power consumption.

2. Related Art

Electronics devices often include components that operate using different clock signals. In some instances those different clocks are extremely disparate from one another. In this case, when the components need to communicate (transfer data) with each other, the differing clock signals can present significant latency and/or power consumption that is often unacceptable for proper device operation.

To provide an example, a wireless communication device, such as a cellular telephone, includes a Baseband Processor that operates on a 100 MHz clock signal, and which must communicate with a Power Management Unit (PMU) that typically operates on a 32 kHz clock signal. Thus, the Baseband Processor operates nearly 3000 times faster than the PMU. As a result, even a simple request to transfer data to the PMU will require a minimum of almost 3000 clock cycles within the Baseband Processor to complete the instruction. This delay consumes significant computing power that the Baseband Processor could be utilizing to perform additional functions, and therefore creates an impermissible drain on system performance. Similar issues arise when attempting to transfer data from the PMU to the Baseband Processor.

Although the above example is provided with respect to a wireless communication device, these problems arise in any electronics device in which two components operating with different clock signals must communicate with each other, and particularly within electronics device containing a PMU, as PMUs components generally operate on an extremely low clock signal and with low power-consumption relative to other components. Examples of such devices may include a standalone or a discrete device, such as a mobile telephone or laptop computer, or may be incorporated within or coupled to another electrical device or host device, such as a portable computing device, a camera, or a Global Positioning System (GPS) unit or another computing device such as a personal digital assistant, a video gaming device, a laptop, a desktop computer, or a tablet, a computer peripheral such as a printer or a portable audio and/or video player to provide some examples and/or any other suitable electronic device that will be apparent to those skilled in the relevant art(s) without departing from the spirit and scope of the invention.

Thus, there is a need for an electronics device that can efficiently provide data transfers between electrical components that operate on different clock signals with reduced latency. Further aspects and advantages of the invention will become apparent from the detailed description that follows.

BRIEF DESCRIPTION OF THE DRAWINGS/FIGURES

Embodiments of the invention are described with reference to the accompanying drawings. In the drawings, like reference numbers indicate identical or functionally similar elements. Additionally, the left most digit(s) of a reference number identifies the drawing in which the reference number first appears.

Figure 1:
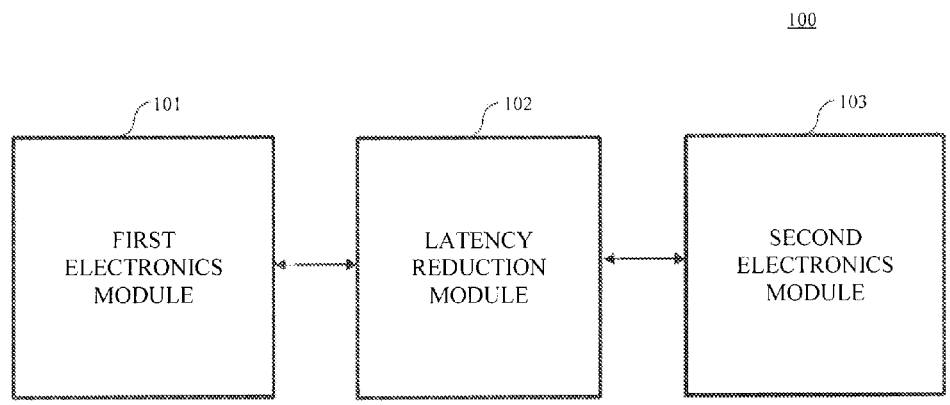
FIG. 1 illustrates a block diagram of an electronics apparatus according to an exemplary embodiment of the invention.

The invention will now be described with reference to the accompanying drawings. In the drawings, like reference numbers generally indicate identical, functionally similar, and/or structurally similar elements. The drawing in which an element first appears is indicated by the leftmost digit(s) in the reference number.

DETAILED DESCRIPTION OF THE INVENTION

The following Detailed Description refers to accompanying drawings to illustrate exemplary embodiments consistent with the invention. References in the Detailed Description to "one exemplary embodiment," "an exemplary embodiment," "an example exemplary embodiment," etc., indicate that the exemplary embodiment described may include a particular feature, structure, or characteristic, but every exemplary embodiment may not necessarily include the particular feature, structure, or characteristic. Moreover, such phrases are not necessarily referring to the same exemplary embodiment. Further, when a particular feature, structure, or characteristic is described in connection with an exemplary embodiment, it is within the knowledge of those skilled in the relevant art(s)

to affect such feature, structure, or characteristic in connection with other exemplary embodiments whether or not explicitly described.

The exemplary embodiments described herein are provided for illustrative purposes, and are not limiting. Other exemplary embodiments are possible, and modifications may be made to the exemplary embodiments within the spirit and scope of the invention. Therefore, the Detailed Description is not meant to limit the invention. Rather, the scope of the invention is defined only in accordance with the following claims and their equivalents.

Embodiments of the invention may be implemented in hardware (e.g., circuits), firmware, software, or any combination thereof. Embodiments of the invention may also be implemented as instructions stored on a machine-readable medium, which may be read and executed by one or more processors. A machine-readable medium may include any mechanism for storing or transmitting information in a form readable by a machine (e.g., a computing device). For example, a machine-readable medium may include read only memory (ROM); random access memory (RAM); magnetic disk storage media; optical storage media; flash memory devices; electrical, optical, acoustical or other forms of propagated signals (e.g., carrier waves, infrared signals, digital signals, etc.), and others. Further, firmware, software, routines, instructions may be described herein as performing certain actions. However, it should be appreciated that such descriptions are merely for convenience and that such actions in fact results from computing devices, processors, controllers, or other devices executing the firmware, software, routines, instructions, etc.

The following Detailed Description of the exemplary embodiments will so fully reveal the general nature of the invention that others can, by applying knowledge of those skilled in relevant art(s), readily modify and/or adapt for various applications such exemplary embodiments, without undue experimentation, without departing from the spirit and scope of the invention. Therefore, such adaptations and modifications are intended to be within the meaning and plurality of equivalents of the exemplary embodiments based upon the teaching and guidance presented herein. It is to be understood that the phraseology or terminology herein is for the purpose of description and not of limitation, such that the terminology or phraseology of the present specification is to be interpreted by those skilled in relevant art(s) in light of the teachings herein.

Although the description of the present invention is to be described in terms of wireless communication (specifically cellular communication), those skilled in the relevant art(s) will recognize that the present invention may be applicable to other communications that use wired or other wireless communication methods without departing from the spirit and scope of the present invention.

An Exemplary Electronics Apparatus

FIG. 1 illustrates a block diagram of an electronics apparatus 100 according to an exemplary embodiment of the invention. The electronics apparatus 100 includes a first electronics module 101 and a second electronics module 103 that are each configured to communicate with each other. The first electronics module 101 operates based on a first clock signal. The first clock signal is an electronic waveform signal that repeats with a particular frequency and dictates when operations within the first electronics module 101 occur. For example, the first electronics module 101 performs functions at a rising and/or a falling edge of the first clock signal.

Similarly, the second electronics module 103 operates based on a second clock signal that is slower than the first clock signal. In other words, the second clock signal is an electronic waveform operating at a lower frequency than the frequency of the first clock signal, and dictates when operations within the second electronics module 103 occur. Clock signals are generally substantially square wave signals with a 50% duty rate, and are generated by a piezoelectric crystal oscillator, although other clock signals may be used within the spirit and scope of the present invention.

When the difference between the frequency of the first clock signal and the frequency of the second clock signal is sufficiently large, communication between the first electronics module 101 and the second electronics module 103 will suffer from significant latency, which can greatly reduce performance of the electronics apparatus 100. Therefore, the electronics apparatus 100 of the exemplary embodiment also includes a latency reduction module 102. The latency reduction module 102 is configured to permit data transfer between the first electronics module 101 and the second electronics module 103 with reduced latency, thereby enhancing performance of the electronics apparatus 100. The latency reduction module 102 can be located within the first electronics module 101, within the second electronics module 103, in each of the first electronics module 101 and the second electronics module 103, or separate from each of the first electronics module 101 and the second electronics module 103.

An Exemplary Electronics Apparatus for Transferring Data "Downstream"

Figure 2:
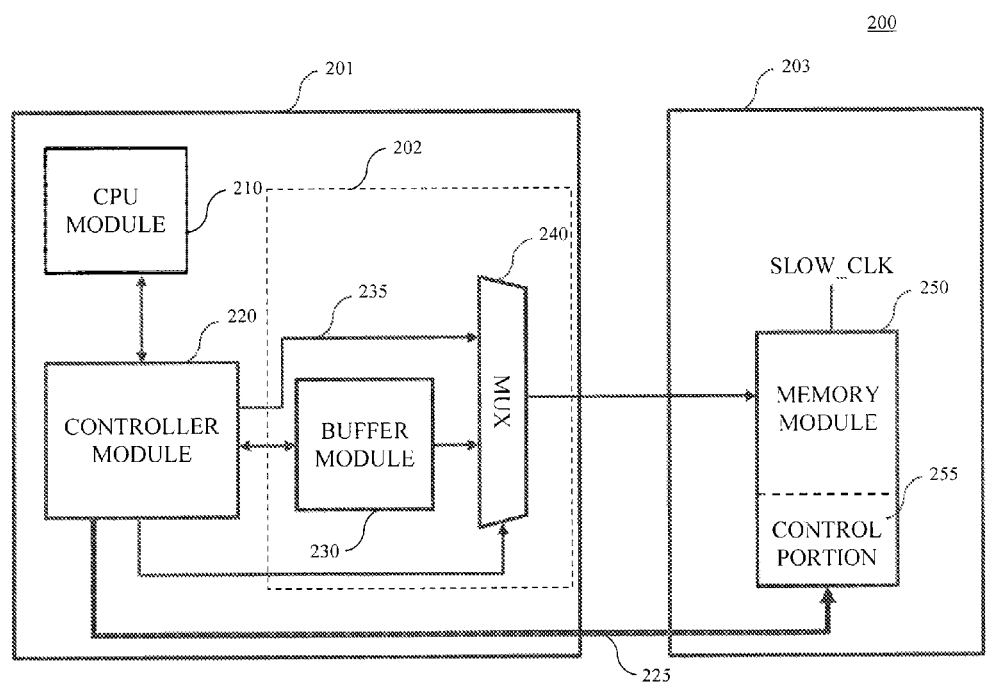
FIG. 2 illustrates a block diagram of an electronics apparatus having a configuration for transferring data "downstream" according to an exemplary embodiment of the invention.

FIG. 2 illustrates a block diagram of an electronics apparatus 200 having a configuration for transferring data "downstream" (from an electronics component operating at a higher clock frequency to an electronics component operating at a lower clock frequency) according to an exemplary embodiment of the invention. The electronics apparatus 200 includes a first electronics module 201 that may represent an exemplary embodiment of the first electronics module 101, a second electronics module 203 that may represent an exemplary embodiment of the second electronics apparatus 103, and a communication conversion module 202 that may represent an exemplary embodiment of the latency reduction module 102. For simplicity of discussion, only elements of the electronics apparatus 200 relating to the downstream transfer of data are discussed.

The second electronics module 203 can include numerous modules to which data may be transferred. However, for purposes of this discussion, it will be presumed that data is to be transferred to a memory module 250 within the second electronics module 203. The memory module 250 operates based on the second clock signal (illustrated as "SLOW_CLK") and includes a control portion 255.

1. Standard Data Transfer

The first electronics module 201 includes a CPU module 210 that performs various of its operations. When the CPU module 210 desires to write information to the memory module 250, the CPU module 210 instructs a controller module 220 accordingly.

The controller module 220 generates the data for writing to the memory module 250, and transfers the data to a buffer module 230 using the first clock signal. Preferably the controller module 220 generates the data to have a size that completely or substantially fills the buffer module 230. If the data to be transferred is less than the capacity of the buffer module 230, the controller module 220 transfers the entire data. Alternatively, if the data to be transferred exceeds the capacity of the buffer module 230, the controller module 220 transmits only a portion of the data to be transferred to the buffer module 230. The portion is preferably equal to, or substantially equal to, a capacity of the buffer module 230. The buffer module 230 is preferably a First-In, First-Out (FIFO) random access memory (RAM), but can be any other re-writable data storage device capable of temporarily storing data within the spirit and scope of the invention.

Once the buffer module 230 has sufficient data (e.g., the buffer module can be filled completely or can include as little as one data word), the memory module 250 can then receive the data from the buffer module 230 based on the second clock signal. For example, the controller module 220 can instruct the memory module 250 that data awaits retrieval in the buffer module 230. The memory module 250 can then retrieve the data from the buffer module 230 using the second clock signal. Alternatively, the memory module 250 can monitor the status of the buffer module 230, or the buffer module 230 can be configured to forward the data to the memory module 250.

In addition, once the buffer module 230 has been filled, the controller module 220 need not wait for the completion of the data transfer, nor must the controller module 220 continuously generate the data. Therefore, the controller module 220 and the CPU module 210 are free to perform other device functions. Once all the data has been transferred out of the buffer module 230, the buffer module 230 then generates an interrupt and forwards the interrupt to the controller module 220. The receipt of the interrupt from the buffer module 230 informs the controller module 220 that the buffer module 230 is available to receive additional data for transfer to the second electronics module 203. Once the interrupt has been received, the controller module 220 can generate new data (either entirely new, or a new portion of the previous data to be transferred), and repeat the process of transferring the new data to the second electronics module 203.

In this manner, the controller module 220 and the CPU 210 are not subject to the latency associated with transferring the data to the second electronics module 203. Further, although the buffer module 230 is subject to the latency, the buffer module 230 does not perform other device functions of the electronics apparatus 200. As such, performance of the electronics apparatus 200 is greatly enhanced.

2. High-Priority Data Transfer

Occasionally, it may be desirable to allow the controller module 220 to transfer data to the memory module 250 without first filling the buffer module 230, or to transfer data to the memory module 250 without waiting for the buffer module 230 to first empty. Thus, the latency reduction module 202 can also include a buffer bypass 235 and a multiplexer 240.

The buffer bypass 235 is connected between the controller module 220 and the multiplexer 240. An output of the buffer module 230 is also connected to the multiplexer 240. An output of the multiplexer 240 is connected to the memory module 250. For standard data transfer, the controller module 220 fills the buffer module 230 with data, as discussed above, and controls the multiplexer 240 to select the buffer module 230 at its input.

Conversely, when high-priority data is sought to be transferred with minimal delay, the controller module 220 generates the high-priority data and transmits the high-priority data via the buffer bypass 235. The controller module 220 controls the multiplexer 240 to select the buffer bypass 235 at its input, thereby transferring the high-priority data to the memory module 250.

In this manner, the controller module 220 and CPU module 210 are protected from the latency associated with the data transfer during all standard data transfers, but are still able to provide high-priority data to the second electronics module 203 with minimal delay. This configuration provides more robustness, which can optionally be used by the electronics apparatus 200 during certain scenarios.

3. Command-Based Data Alteration

Many electronics components allow for data contained therein to be changed based on a command signal. For example, in a case where the second electronics module 203 is a power management unit (PMU), the memory module 250 contains data defining power configurations of various components within the electronics apparatus 200. In this instance, the control module 255 of the memory module 250 can alter the data contained within the memory module 250 to correspond to predefined power configurations based on a single command signal. Other types of electronics components may employ a similar command-based data alteration scheme to select one of a plurality of predetermined data configurations.

In this configuration, the controller module 220 of the first electronics module 201 can be directly connected to the control portion 255 of the memory module 250 via a command bus 225. When the controller module 220 desires to immediately alter the data within the memory module 250 to correspond to a predefined data configuration, the controller module 220 generates a command signal identifying the desired power configuration. The controller module 220 then transmits the command signal to the control portion 255 via the command bus 225. Upon receipt of the command signal, the control portion 255 alters the necessary data contained within the memory module 250 to correspond to the predefined data configuration selected by the command signal.

Those skilled in the relevant art(s) will recognize that each of the above configurations of the electronics apparatus 200 can be utilized individually, or in combination with the others, and that numerous modifications may be available within the spirit and scope of the present invention. For example, the multiplexer may be located in the second electronics module 203 or the communications conversion module 202 may be implemented separately from the first electronics module 201.

An Exemplary Electronics Apparatus for Transferring Data "Upstream"

During downstream data transfer (i.e., transfer of data from an electronics component operating at a faster clock frequency to an electronics component operating at a slower clock frequency), latency occurs because the electronics component that operates at the slower clock frequency can only receive the transferred data at that frequency. However, this problem can potentially be avoided during upstream data transfer (i.e., transfer of data from an electronics component operating at a slower clock frequency to an electronics component operating at a faster clock frequency) because the faster electronics component can read data values stored within the slower electronics component without waiting for the slower component to perform any particular function. However, because such a data read ignores operations of the slower component, the retrieved data may be corrupted if read while the data is being altered within the slower component.

Figure 3A:
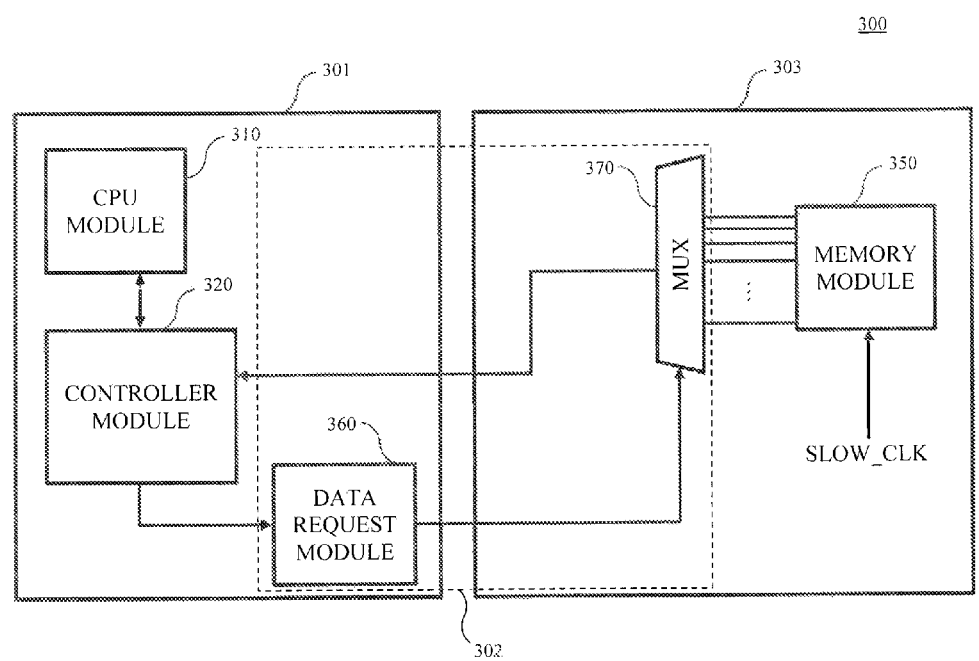
FIG. 3A illustrates a block diagram of an electronics apparatus having a configuration for transferring data "upstream" according to an exemplary embodiment of the invention.

Therefore, FIG. 3A illustrates a block diagram of an electronics apparatus 300 having a configuration for transferring data "upstream" according to an exemplary embodiment of the invention. The electronics apparatus 300 includes a first electronics module 301 that may represent an exemplary embodiment of the first electronics module 101, a second electronics module 303 that may represent an exemplary embodiment of the second electronics apparatus 103, and a communication conversion module 302 that may represent an exemplary embodiment of the latency reduction module 102. For simplicity of discussion, only elements of the electronics apparatus 300 relating to the upstream transfer of data are discussed.

The second electronics module 303 can include numerous modules from which data can be transferred. However, for purposes of this discussion, it will be presumed that data is to be transferred from a memory module 350 within the second electronics module 303. The memory module 350 operates based on the second clock signal (illustrated as "SLOW_CLK"). The latency reduction module 302 includes a data request module 360 and a multiplexer 370, and is partially located in each of the first electronics module 301 and the second electronics module 303, as discussed in further detail below.

1. Repeat Data Retrieval and Compare

The first electronics module 301 includes a CPU module 310 connected to a controller module 320. In addition, in the second electronics module 303, the memory module 350 stores data at a plurality of data registers that each have a corresponding data address. Each of the data registers within the memory module is connected to the multiplexer 370.

When the CPU module 310 desires to retrieve data contained in the second electronics module 303, the CPU module 310 instructs the controller module 320 accordingly. The controller module 320 then generates a data request signal, which it forwards to the data request module 360. Upon receipt of the data request signal, the data request module 360 transmits to the multiplexer 370 a data address corresponding to the data register of the data requested by the controller module 320. The multiplexer 370 outputs the data stored in the data register upon receipt of the data address from the data request module 360.

The time required for the multiplexer 370 to output the requested data after receipt of the data address constitutes a request window. If the data contained within the data register corresponding to the data address is changed during the request window, the outputted data may be corrupted or may be different from the data desired to be retrieved by the first electronics module 301.

In order to ensure accurate data retrieval, once the data request module 360 has transmitted the data address to the multiplexer 370, the data request module 360 repeats the data request at the conclusion of the request window one or more times. In order to minimize error, the data request module preferably transmits the data request three times, although other repetition amounts may be used based on application. As a result, the multiplexer 370 outputs the data contained within the data register that corresponds to the data address three consecutive times.

The controller module 320 receives each of the data outputs and compares the values of those data outputs to each other. If each of the received data outputs are equal to one another, the data is accepted by controller module 320 as accurate. If, on the other hand, the controller module 320 determines that each of the received data outputs are not equal, the controller module 320 instructs the data request module 360 to repeat the data request.

In this manner, the first electronics module 301 is able to quickly retrieve data contained within the second electronics module 303 with relative disregard for the slower clock. As an example, the first electronics module 301 may operate at 100 MHz, whereas the second electronics module 303 may operate at 32 kHz. In this scenario, if the request window is five times as long as a period of the first clock (i.e., 50 ns), a total request could require as long as 300 ns (i.e., 150 ns for the first three requests and 150 ns for the repeated three requests). Conversely, in a conventional electronics device, the first electronics component would transmit a request to the second electronics component. Even if the second electronics component was able to respond with the data in a single clock cycle of the second clock, the request would require a minimum of $\frac{1}{32000}$ s=31,250 ns. Thus, the exemplary embodiment demonstrates remarkable improvement over data retrieval capabilities of conventional devices.

Those skilled in the relevant art(s) will recognize that many alternative configurations can be implemented. For example, rather than employing a data request module 360, the controller module 320 could generate and transmit the data addresses itself. However, such operation may reduce its overall performance. In addition, rather than forwarding the retrieved data directly to the controller module 320, the multiplexer 370 could instead forward it to the data request module 360. This would allow the data request module 360 to immediately determine the end of the request window and would allow for the comparison processing to be removed from the controller module 320. Also, rather than retransmitting the data address, the data request module 360 may alternatively continue transmitting the data address for a duration of three request windows to achieve substantially the same results. In addition, rather than only accepting the data if all are equal, the controller module 320 could instead accept the data if a majority of the retrieved data are equal.

2. Retrieve Data While Monitoring Second Clock

Figure 3B:
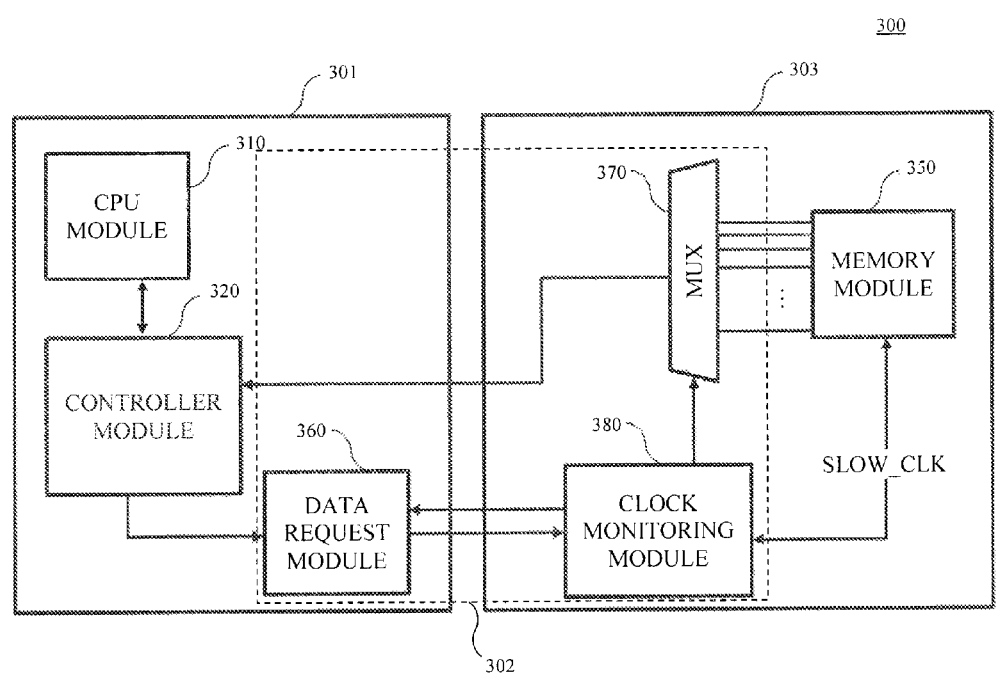
FIG. 3B illustrates a block diagram of an electronics apparatus having a configuration for transferring data "upstream" according to an exemplary embodiment of the invention.

FIG. 3B illustrates a block diagram of the electronics apparatus 300 having a configuration for transferring data "upstream" according to an exemplary embodiment of the invention. The configuration of the electronics apparatus 300 shown in FIG. 3B is substantially the same as the configuration shown in FIG. 3A, except that the latency reduction module 302 further includes a clock monitoring module 380.

In this electronics apparatus 300, the data request module 360 forwards the data address corresponding to a data register containing desired data to the clock monitoring module 380. The clock monitoring module 380 receives the data address from the data request module 360, and forwards the data address to the multiplexer 370. Upon receipt of the data address, the multiplexer 370 outputs the data located within the data register in memory module 350 corresponding to the data address to the controller module 320.

As discussed above, the time from the transmission of the data address to the multiplexer 370 to the time at which the multiplexer 370 outputs the requested data constitutes a request window. When the clock monitoring module 380 receives the data address from the data request module 360, the clock monitoring module 380 monitors the second (slow) clock signal. If, during the request window, the clock monitoring module 380 does not detect a rising and/or falling edge (depending on whether the second electronics component performs operations on a rising edge, falling edge, or both), the data forwarded by the multiplexer 370 to the controller module 320 is determined to be accurate.

If, on the other hand, the clock monitoring module 380 detects a rising and/or falling edge of the second clock signal during the request window, the clock monitoring module 380 outputs a clock detection signal to the data request module 360. Upon receipt of the clock detection signal, the data request module 360 instructs the controller module 320 to ignore the current data received from the multiplexer 370. The data request module 360 then repeats its transmission of the data address to the multiplexer 370 via the clock monitoring module 380. The subsequent data received from the multiplexer is presumed to be correct.

With this configuration, the electronics apparatus 300 is able to transfer data upstream even more quickly. In particular, using the above example, when no clock edge is detected by the clock monitoring module 380, the request takes only 50 ns, as compared to 150 ns in the above case. In addition, even when a clock signal is detected by the clock monitoring module 380, the request takes only 100 ns, as compared to 300 ns in the above case. Thus, this configuration even further reduces latency between fast and slow electronics components. However, this configuration may incur additional power consumption through the monitoring of the second clock signal.

Those skilled in the relevant art(s) will recognize that many modifications can be made to the above configuration within the spirit and scope of the present invention. For example, the functionality of the clock monitoring module 380 can be incorporated into the data request module 360, to which the second clock signal can be directly input. In addition, in order to reduce power consumption, the clock monitoring module 380 can be configured to only detect the second clock signal within the request window, or to be bypassed during a subsequent request that follows an interrupted request. To even further optimize the electronics apparatus 300, the clock monitoring module 380 can be configured to also detect whether data was written to the particular memory address during the request window, and to only output an error signal when the data has been changed during the request window. In this manner, the data request module 360 can eliminate unnecessary repeat read attempts.

Figure 4:
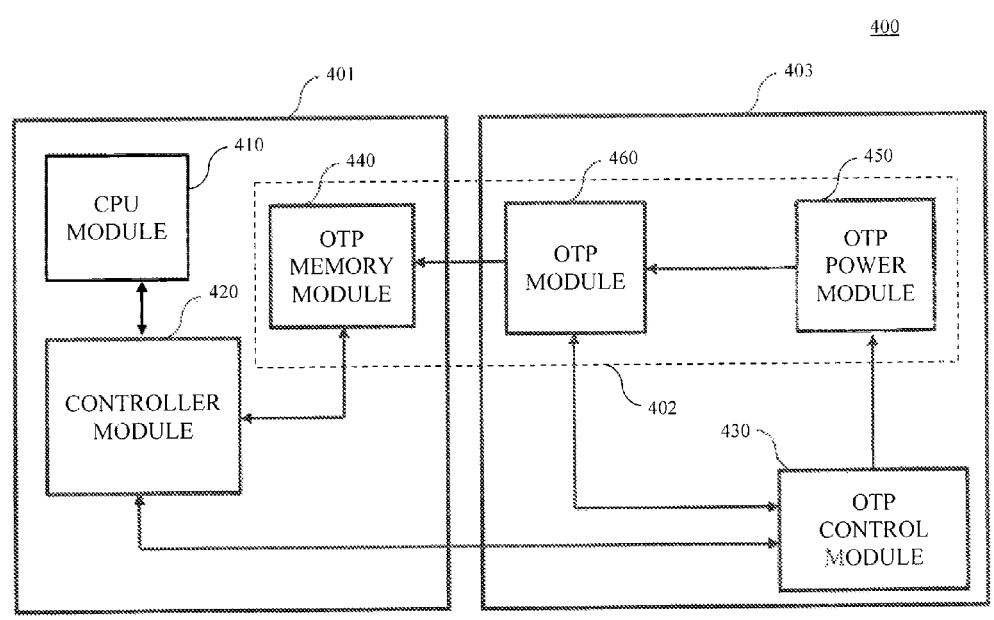
FIG. 4 illustrates a block diagram of an electronics apparatus configured to reduce one-time programmable (OTP) module power consumption and latency according to an exemplary embodiment of the invention.

An Exemplary Electronics Apparatus Conifugred to Reduce Power Consumption by OTP FIG. 4 illustrates a block diagram of an electronics apparatus 400 configured to reduce one-time programmable (OTP) module latency and power consumption according to an exemplary embodiment of the invention. The electronics apparatus 400 includes a first electronics module 401 and a second electronics module 403 and a latency reduction module 402, and may represent an exemplary embodiment of the electronics apparatus 100. The first electronics module 401 includes an OTP memory module 440 and may represent an exemplary embodiment of the first electronics module 101, and the second electronics module 403 includes an OTP power module 450 and an OTP module 460 and may represent an exemplary embodiment of the second electronics module 103. For simplicity of discussion, only elements relating to reducing power consumption and/or latency with respect to an OTP module are discussed below.

Many devices include one or more OTP circuits. OTP circuits are programmable read-only memories (PROM), which can generally only be programmed a single time. OTP circuits are programmed with permanent programs relating to device operation, and consume significant amounts of power during both a write phase and a read phase. For example, a typical OTP circuit requires 3.3V during a write operation and 2.5V during a read operation. Further, because most electronics devices include multiple OTP circuits (e.g., one for a faster component and one for a slower component), reading data from the OTPs can result in significant power consumption, which can be particularly detrimental in portable electronics apparatuses, such as mobile telephones or laptop computers.

Therefore, the electronics apparatus 400 includes only a single OTP module 460 that has been programmed with data relating to both the first electronics module 401 and the second electronics module 403. The OTP module 460 is preferably located in the electronics module that is first to be booted during device start-up. Therefore, the discussion below presumes that the second electronics module 403 is booted earlier than the first electronics module 401 during start-up of the electronics apparatus 400.

At start-up, the electronics apparatus 400 first boots the second electronics module 403. As part of its boot procedure, an OTP control module 430 instructs the OTP power module 450 to supply a read power to the OTP module 460. The OTP control module 430 then requests and receives desired information from the OTP module 460 at the second clock frequency.

After initiating the boot of the second electronics module 403, the electronics apparatus 400 then boots the first electronics module 401. Once the first electronics module 401 is powered on, the controller module 420 of the first electronics module 401 notifies the second electronics module 403. The OTP control module 430 then instructs the OTP power module 450 to supply the OTP module 460 with the read power. The controller module 420 then causes the OTP memory module 440 to read and store at least a portion of the data contained in the OTP module 460. Preferably all of the data, or at least the data most typically used during device operation, is stored. Once completed, the controller module 420 of the first electronics module 401 notifies the OTP control module 430 of the second electronics module 403. The second electronics module 403 then instructs the OTP power module 450 to stop supplying power to the OTP module 460.

Once the data has been stored in the OTP memory module 440, future requests for the OTP data can be made to the first electronics module 401, which operates at a faster clock frequency than that of OTP memory module 440, thereby reducing read latency. Further, because the OTP module 460 must no longer be turned on to read the OTP data, the power consumption of the electronics apparatus 400 can be significantly reduced.

As discussed above, reading information from the OTP module 460 by the second electronics module 403 should be performed at the second clock frequency. Specifically, because the second electronics module 403 operates at the same second clock frequency as the OTP module 460, there is no need to vary the clock speed of the OTP module 460 when data reads are performed by the second electronics module 403. This also helps to keep dynamic power low within the second electronics module 403. On the other hand, when the first electronics module 401 reads data from the OTP module 460, it may be desirable to operate the OTP module 460 at the first clock frequency in order to reduce the latency between the OTP module 460 and the first electronics module 401. This change in clock speeds can be accomplished through a clock multiplexing scheme or simple clock switch.

Exemplary OTP Power Module

Figure 5:
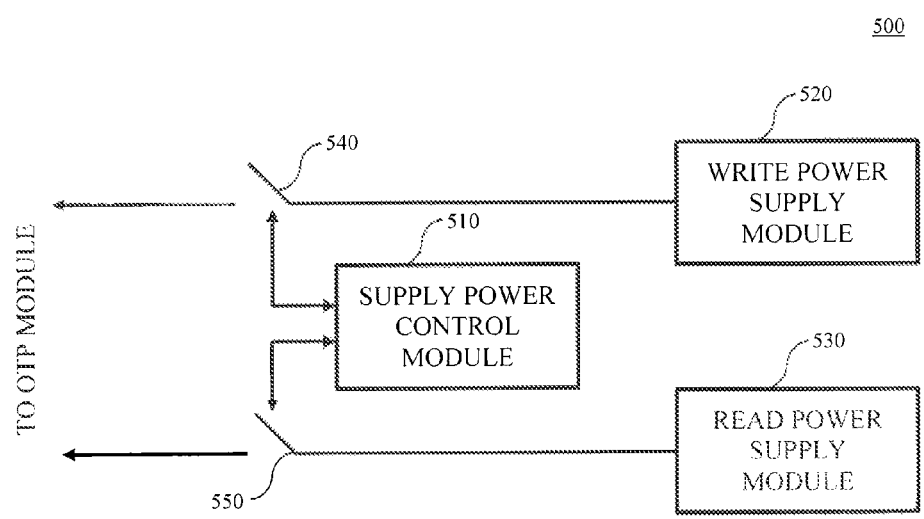
FIG. 5 illustrates a block diagram of an OTP power module that may be used as part of the electronics apparatus according to an exemplary embodiment of the invention.

FIG. 5 illustrates a block diagram of an OTP power module 500 that may be used as part of the electronics apparatus 400 according to an exemplary embodiment of the invention. The OTP power module 500 includes a supply power control module 510 and may represent an exemplary embodiment of the OTP power module 460.

The OTP power module 500 includes a write power supply module 520 that supplies a write power (e.g., 3.3V) and a read power supply module 530 that supplies a read power (e.g., 2.5V). An output of the write power supply module 520 includes a switch 540 and an output of the read power supply module 530 includes a switch 550 that are each controlled by the supply power control module 510.

The supply power control module 510 receives instruction signals from the OTP control module 430 within the second electronics module 403 that dictate whether the OTP power module 500 should output the write power, the read power, or no power. Depending on the instruction signal received, the supply power control module 510 controls the switches 540 and 550 accordingly.

For example, if the supply power control module 510 receives an instruction to output the write power, the supply power control module 510 closes the switch 540 (and opens switch 550 if necessary) to supply the write power from the write power supply module 520. If the supply power control module 510 receives an instruction to output the read power, the supply power control module 510 closes the switch 550 (and opens switch 540 if necessary) to supply the read power from the read power supply module 530. Lastly, if the supply power control module 510 receives an instruction to supply no power, the supply power control module 510 opens each of the switch 540 and the switch 550.

Those skilled in the relevant art(s) will recognize that multiple configurations are available for the OTP power module 500 within the spirit and scope of the present invention. For example, the switches 540 and 550 could be replaced with a multiplexer to select one of the power supply modules.

An Exemplary Method of Transferring Data Downstream

Figure 6:
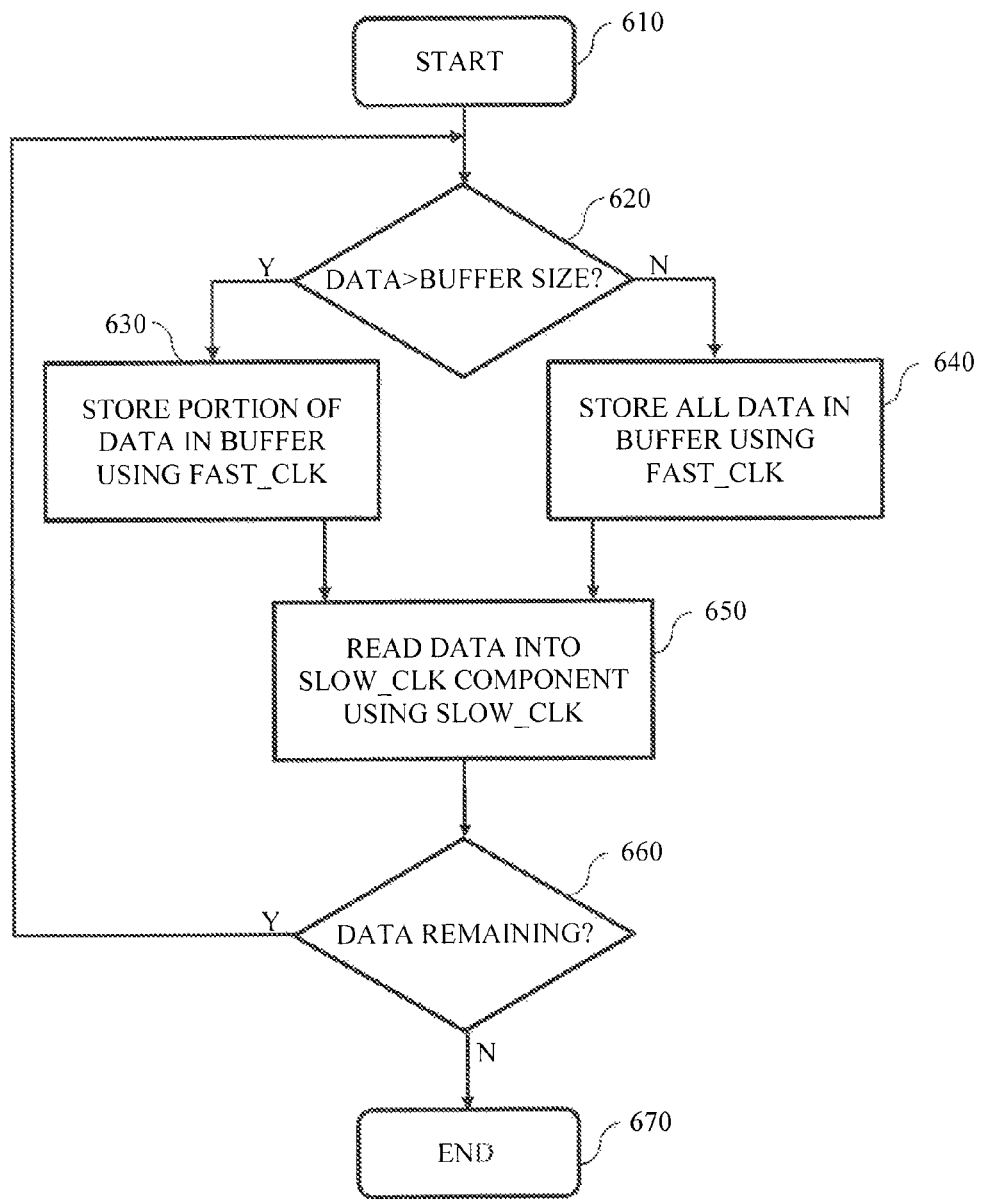
FIG. 6 illustrates a block diagram of a method for transferring data downstream according to an exemplary embodiment of the invention.

FIG. 6 illustrates a block diagram of a method for transferring data downstream (from a fast clock electrical component to a slow clock electrical component) according to an exemplary embodiment of the invention.

The method begins at step 610 and immediately proceeds to step 620. In step 620, the fast clock electrical component determines whether the data sought to be transferred exceeds a capacity of a buffer. If the data does exceed the buffer capacity, the method proceeds to step 630. In step 630, the fast clock electrical component stores a portion, but not all, of the data in the buffer using the fast clock signal. The portion of the data preferably has a size equal to the capacity of the buffer. The method then proceeds to step 650.

Alternatively, if in step 620 it is determined that the data does not exceed the buffer size, the method proceeds to step 640. In step 640, all of the data is transferred to the buffer using the fast clock signal. The method then proceeds to step 650.

In step 650, the slow clock electrical component reads the data from the buffer using the slow clock signal. Once all the data stored in the buffer has been read by the slow clock electrical component, the method proceeds to step 660. In step 660, a determination is made as to whether additional data remains to be transferred. This additional data can be remaining portions of the current data, or can be new data. If there is remaining data, the method returns to step 620. Alternatively, if there is no remaining data, the method proceeds to step 670, where the method ends.

Those skilled in the relevant art(s) will recognize that the above method can additionally or alternatively include any of the functionality of the electronics apparatus 200 discussed above, as well as any of its modifications. Further, the above description of the exemplary method should neither be construed to limit the method nor the description of the wireless communication apparatus 200.

Exemplary Methods of Transferring Data Upstream

Figure 7A:
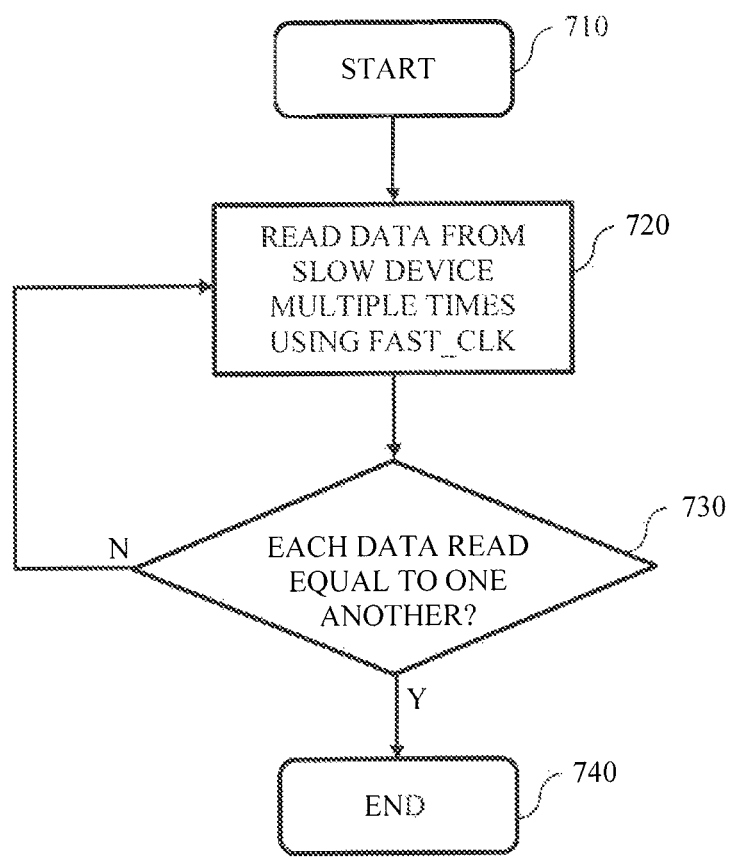
FIG. 7A illustrates a block diagram of a method for transferring data upstream according to an exemplary embodiment of the invention.

FIG. 7A illustrates a block diagram of a method for transferring data upstream (from a slow clock electrical component to a fast clock electrical component) according to an exemplary embodiment of the invention.

The method begins at step 710 and immediately proceeds to step 720. In step 720, the fast clock electrical component reads the data from the slow clock electrical component multiple times (e.g., three times). The method then proceeds to step 730. In step 730, a determination is made as to whether each of the data read during step 720 is equal to one another. If they are not equal to each other, the method returns to step 720 in order to read the data again. Alternatively, if the data are equal to each other, the method proceeds to step 740, where the method ends.

Figure 7B:
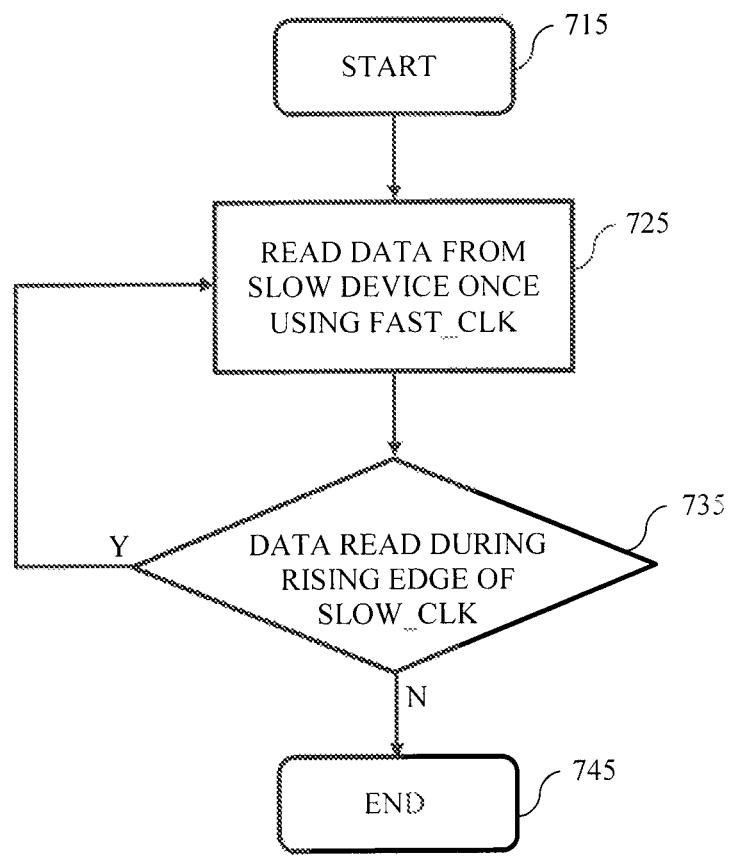
FIG. 7B illustrates a block diagram of a method for transferring data upstream according to an exemplary embodiment of the invention.

FIG. 7B illustrates a block diagram of another method for transferring data upstream according to an exemplary embodiment of the invention.

The method begins at step 715 and immediately proceeds to step 725. In step 725, the fast clock electrical component reads data from the slow clock electrical component only once. The method then proceeds to step 735. In step 735, a determination is made as to whether the data was read during a rising edge (or falling edge, depending on operation of the slow clock electrical component) of the slow clock electrical component. If it is determined that the data was read during the rising edge of the slow clock signal, the method returns to step 725 in order to again read the data. Alternatively, if it is determined that the data was not read during the rising edge of the slow clock signal, the method proceeds to step 745, where the method ends.

Those skilled in the relevant art(s) will recognize that each of the above methods can additionally or alternatively include any of the functionality of the wireless communication apparatus 300 discussed above, as well as any of its modifications. Further, the above description of the exemplary method should neither be construed to limit the method nor the description of the wireless communication apparatus 300.

Figure 8:
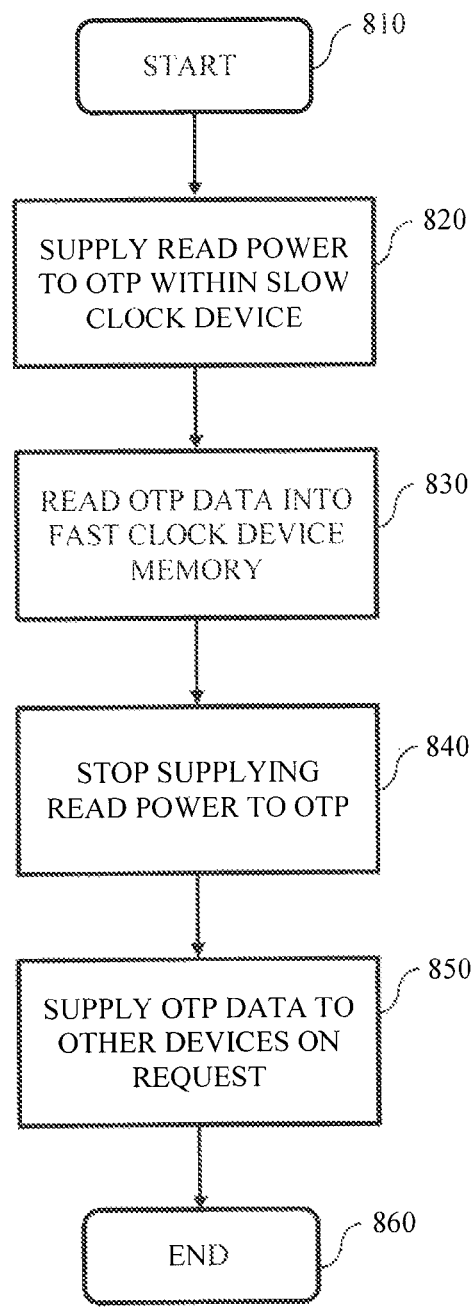
FIG. 8 illustrates a block diagram of a method for reading data contained within an OTP that is located in a slow clock electrical component according to an exemplary embodiment of the invention.

An Exemplary Method of Efficiently Reading Data from an OTP Located within a Slow-Clock Component FIG. 8 illustrates a block diagram of a method for reading data contained within an OTP that is located in a slow clock electrical component according to an exemplary embodiment of the invention.

The method begins at step 810 and immediately proceeds to step 820. In step 820, a read power is supplied to the OTP. The method then proceeds to step 830. In step 830, the fast clock device reads at least a portion of the data contained within the OTP and stores the data in a memory located in the fast clock electrical component. The method then proceeds to step 840.

In step 840, the supply of power to the OTP is stopped. The method then proceeds to step 850. In step 850, components requesting OTP data retrieve the OTP data from the memory of the fast clock electrical component. The method then proceeds to step 860, where the method ends.

Those skilled in the relevant art(s) will recognize that each of the above methods can additionally or alternatively include any of the functionality of the wireless communication apparatus 400 discussed above, as well as any of the modifications discussed above. Further, the above description of the exemplary method should neither be construed to limit the method nor the description of the wireless communication apparatus 400.

CONCLUSION

It is to be appreciated that the Detailed Description section, and not the Abstract section, is intended to be used to interpret the claims. The Abstract section may set forth one or more, but not all exemplary embodiments, of the invention, and thus, are not intended to limit the invention and the appended claims in any way.

The invention has been described above with the aid of functional building blocks illustrating the implementation of specified functions and relationships thereof. The boundaries of these functional building blocks have been arbitrarily defined herein for the convenience of the description. Alternate boundaries may be defined so long as the specified functions and relationships thereof are appropriately performed.

It will be apparent to those skilled in the relevant art(s) that various changes in form and detail can be made therein without departing from the spirit and scope of the invention. Thus the invention should not be limited by any of the above-described exemplary embodiments, but should be defined only in accordance with the following claims and their equivalents.

What is claimed is:

1. An electronics apparatus, comprising:
a first electronics module configured to perform operations based on a first clock signal;
a second electronics module configured to perform operations based on a second clock signal, the second clock signal being slower than the first clock signal;
a latency reduction module configured to reduce latency during transfer of data between the first electronics module and the second electronics module that arises due to the difference between the first clock signal and the second clock signal, the latency reduction module including a buffer module configured to store the data; and
a controller module configured to generate the data, and to load the data into the buffer module using the first clock signal,
wherein the second electronics module is configured to retrieve data from the buffer module at a frequency of the second clock signal, and
wherein if a size of the data generated by the controller module exceeds a capacity of the buffer module, then the buffer module receives a portion of the data from the controller module, the portion of the data having a size substantially equal to the capacity of the buffer module.

2. The electronics apparatus of claim 1, wherein after the portion of the data has been received by the second electronics module from the buffer module, the buffer module generates an interrupt signal and forwards the interrupt signal to the controller module, and
after the controller module receives the interrupt signal, the buffer module receives a subsequent portion of the data.

3. The electronics apparatus of claim 1, wherein the latency reduction module includes a buffer bypass configured to transfer the data from the controller module to the second electronics module without the buffer module.

4. The electronics apparatus of claim 3, further comprising a multiplexer having an output connected to the second electronics module, the multiplexer being configured to select one of (1) an output of the buffer module or (2) the buffer bypass.

5. The electronics apparatus of claim 1, wherein the second electronics module includes a control portion configured to alter at least one of data and a setting within the second electronics module based on a command signal, and
the electronics apparatus further includes a command bus configured to supply the command signal from the controller module to the control portion.

6. The electronics apparatus of claim 1, wherein the controller module is further configured to retrieve the data from the second electronics module using the first clock signal.

7. The electronics apparatus of claim 6, wherein the controller module retrieves the data from the second electronics module a predetermined plurality of times.

8. The electronics apparatus of claim 7, wherein the controller module compares each of the predetermined plurality of data to each other, and
if the controller module determines that the each of the predetermined plurality of data is not substantially equal to one another. the controller module again retrieves the data from the second electronics module.

9. The electronics apparatus of claim 6, wherein the latency reduction module includes a clock monitoring module configured to monitor the second clock signal and to detect at least one of a rising edge and a falling edge of the second clock signal.

10. The electronics apparatus of claim 9, wherein the clock monitoring module only monitors the second clock signal while the controller module is retrieving the data.

11. The electronics apparatus of claim 10, wherein when the clock monitoring module detects the at least one of the rising edge and the falling edge of the second clock signal, the clock monitoring module generates an error signal and forwards the error signal to the controller module, and
upon receipt of the error signal, the controller module ignores the data retrieved.

12. The electronics apparatus of claim 10, wherein when the clock monitoring module detects the at least one of the rising edge and the falling edge of the second clock signal, the clock monitoring module generates an error signal and forwards the error signal to the controller module, and
upon receipt of the error signal, the controller module cancels a current data retrieval.

13. The electronics apparatus of claim 12, wherein upon receipt of the error signal, the controller module initiates a second data retrieval to again retrieve the data from the second electronics module.

14. The electronics apparatus of claim 11, wherein upon receipt of the error signal, the controller module initiates a second data retrieval to again retrieve the data from the second electronics module.

15. An electronics apparatus, comprising:
a first electronics module configured to perform operations based on a first clock signal;
a second electronics module configured to perform operations based on a second clock signal, the second clock signal being slower than the first clock signal;
a latency reduction module configured to reduce latency during transfer of data between the first electronics module and the second electronics module that arises due to the difference between the first clock signal and the second clock signal,
wherein the second electronics module includes a one-time programmable (OTP) module configured to store the data, and
the second electronics module includes an OTP power module configured to supply a write power, a read power, and no power to the OTP module.

16. The electronics apparatus of claim 15, wherein the first electronics module includes an OTP memory module configured to store the data,
the OTP power module supplies the read power to the OTP module,
the OTP memory module receives and stores the data from the OTP module, and
after the data has been stored in the OTP memory module, the OTP power module supplies no power to the OTP module.

17. The electronics apparatus of claim 16, further comprising a third electronics module configured to request the data from the first electronics module, wherein the first electronics module supplies the data to the third electronics module from the OTP memory module.

18. A method of transferring data from a first electronics device operating at a first clock signal to a second electronics device operating at a second clock signal having a lower frequency than the first clock signal, the method comprising:
generating the data in the first electronics device;
loading the data in a buffer within the first electronics device using the first clock signal, the loading including loading a portion of the data into the buffer that is substantially equal in size to a capacity of the buffer when a size of the data exceeds the buffer capacity; and
retrieving, by the second electronics device, the plurality of data from the buffer at a frequency of the second clock signal.

19. A method of transferring data from a second electronics device operating at a second clock, signal to a first electronics device operating at a first clock signal having a higher frequency than the second clock signal, the method comprising:
retrieving the data, by the first electronics device, from the second electronics device using the first clock signal;
detecting whether the retrieving of the data by the first electronics device occurred during a rising edge or a falling edge of the second clock signal; and
if the retrieving of the data by the first electronics device occurred during the rising edge or the falling edge of the second clock signal, again retrieving the data, by the first electronics device, from the second electronics device using the first clock signal.

* * * * *

UNITED STATES PATENT AND TRADEMARK OFFICE
CERTIFICATE OF CORRECTION

PATENT NO. : 9,225,343 B2  
APPLICATION NO. : 13/338001  
DATED : December 29, 2015  
INVENTOR(S) : Kothari et al.

It is certified that error appears in the above-identified patent and that said Letters Patent is hereby corrected as shown below:

IN THE CLAIMS

In column 14, line 6, replace "another. the" with --another, the--.

Signed and Sealed this  
Twelfth Day of April, 2016

Michelle K. Lee  
*Director of the United States Patent and Trademark Office*